US009991971B2

(12) United States Patent
Mofidi

(10) Patent No.: US 9,991,971 B2
(45) Date of Patent: Jun. 5, 2018

(54) SYSTEMS AND METHODS FOR REDUCING TRANSMISSION INTERFERENCE

(71) Applicant: QUALCOMM Incorporated, San Diego, CA (US)

(72) Inventor: Mahbod Mofidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/260,689

(22) Filed: Apr. 24, 2014

(65) Prior Publication Data
US 2015/0072623 A1 Mar. 12, 2015

Related U.S. Application Data

(60) Provisional application No. 61/874,977, filed on Sep. 6, 2013.

(51) Int. Cl.
H04B 15/02 (2006.01)
H04B 15/04 (2006.01)
H04B 1/10 (2006.01)
H04B 1/403 (2015.01)

(52) U.S. Cl.
CPC .......... *H04B 15/02* (2013.01); *H04B 1/1027* (2013.01); *H04B 15/04* (2013.01); *H04B 1/406* (2013.01)

(58) Field of Classification Search
CPC .................................................... H04B 15/02
See application file for complete search history.

(56) References Cited

U.S. PATENT DOCUMENTS

| 2,810,074 A * | 10/1957 | Hahnel ..................... H03L 7/00 331/19 |
| 7,146,176 B2 | 12/2006 | McHenry |
| 8,396,003 B2 | 3/2013 | Leinonen et al. |
| 2007/0047625 A1 | 3/2007 | Klomsdorf et al. |
| 2010/0062801 A1 | 3/2010 | Kim et al. |
| 2010/0195744 A1* | 8/2010 | Schwager ............... H04B 3/54 375/257 |
| 2010/0304770 A1 | 12/2010 | Wietfeldt et al. |
| 2012/0040628 A1 | 2/2012 | Krug et al. |
| 2013/0017781 A1 | 1/2013 | Jones |
| 2013/0045679 A1 | 2/2013 | Orsatti et al. |

FOREIGN PATENT DOCUMENTS

| EP | 2582058 A1 | 4/2013 |
| WO | 2008073768 A1 | 6/2008 |

OTHER PUBLICATIONS

International Search Report and Written Opinion—PCT/US2014/054130—ISA/EPO—dated Nov. 20, 2014.

* cited by examiner

Primary Examiner — Hsin-Chun Liao
(74) Attorney, Agent, or Firm — Austin Rapp

(57) ABSTRACT

A method for reducing transmission interference is described. The method includes determining that an FM receiver is turned on. The method also includes determining that the FM receiver is tuned to an FM channel experiencing interference from an induction-based communication transmitter. The method further includes adjusting a transmit frequency of the induction-based communication transmitter by a temporary frequency shift.

25 Claims, 9 Drawing Sheets

SYSTEMS AND METHODS FOR REDUCING TRANSMISSION INTERFERENCE

RELATED APPLICATIONS

This application is related to and claims priority from U.S. Provisional Patent Application Ser. No. 61/874,977, filed Sep. 6, 2013, for "MITIGATING FM DESENSITIZATION BY NFC."

TECHNICAL FIELD

The present disclosure relates generally to signal processing. More specifically, the present disclosure relates to systems and methods for reducing transmission interference.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices may make use of multiple technologies. For example, a cell phone may include an FM receiver in addition to transceivers for other communication technologies. These technologies may experience interference when used concurrently. For example, an FM receiver may experience desensitization during concurrent use with a near field communication (NFC) radio. Benefits may be realized by reducing the interference between technologies.

SUMMARY

A method for reducing transmission interference is described. The method includes determining that an FM receiver is turned on. The method also includes determining that the FM receiver is tuned to an FM channel experiencing interference from an induction-based communication transmitter. The method further includes adjusting a transmit frequency of the induction-based communication transmitter by a temporary frequency shift.

The method may be performed by a wireless communication device. A magnetic field of the induction-based communication transmitter may be inductively coupled with the FM receiver.

Determining that the FM receiver is tuned to an FM channel experiencing interference from an induction-based communication transmitter may include comparing the tuned FM channel to a list of desensed FM channels. The interference may be caused by a harmonic of the transmit frequency of the induction-based communication transmitter. The temporary frequency shift may reduce interference with the FM receiver.

The method may also include adjusting the transmit frequency of the induction-based communication transmitter when the tuned FM channel is within a frequency threshold from a harmonic of the transmit frequency of the induction-based communication transmitter.

The induction-based communication transmitter may be a near field communication (NFC) transmitter. Operation of the NFC transmitter may be concurrent with FM operation. The temporary frequency shift may be within a specified NFC transmit frequency bandwidth. The NFC transmitter may be acting as an initiator. The NFC transmitter may be performing a polling operation.

An apparatus for reducing transmission interference is also described. The apparatus includes a processor, memory in electronic communication with the processor and instructions stored in the memory. The instructions are executable by the processor to determine that an FM receiver is turned on. The instructions are also executable to determine that the FM receiver is tuned to an FM channel experiencing interference from an induction-based communication transmitter. The instructions are further executable to adjust a transmit frequency of the induction-based communication transmitter by a temporary frequency shift.

A wireless device for reducing transmission interference is also described. The wireless device includes means for determining that an FM receiver is turned on. The wireless device also includes means for determining that the FM receiver is tuned to an FM channel experiencing interference from an induction-based communication transmitter. The wireless device further includes means for adjusting a transmit frequency of the induction-based communication transmitter by a temporary frequency shift.

A computer-program product for reducing transmission interference is also described. The computer-program product includes a non-transitory computer-readable medium having instructions thereon. The instructions include code for causing a wireless communication device to determine that an FM receiver is turned on. The instructions also include code for causing the wireless communication device to determine that the FM receiver is tuned to an FM channel experiencing interference from an induction-based communication transmitter. The instructions further include code for causing the wireless communication device to adjust a transmit frequency of the induction-based communication transmitter by a temporary frequency shift.

DETAILED DESCRIPTION

The systems and methods disclosed herein may be applied to communication devices that communicate wirelessly and/or that communicate using a wired connection or link. It should be noted that some communication devices may communicate wirelessly and/or may communicate using a wired connection or link. For example, some communication devices may communicate with other devices using an Ethernet protocol. In one configuration, the systems and methods disclosed herein may be applied to a communication device that communicates with another device using an induction-based communication technology. One implementation of an induction-based communication technology is near field communication (NFC).

The rise of NFC technology and increased user demand for enhanced FM broadcast receiver (Rx) performance in electronic devices (e.g., mobile devices) has created a potential challenge for concurrency. As used herein, the term "concurrency" refers to the simultaneous (e.g., concurrent) operation of an FM receiver and an induction-based communication transceiver on an electronic device. In some scenarios, one or more harmonics of a transmission by the induction-based communication technology may fall within an FM broadcast band (e.g., 76-108 megahertz (MHz)). This interference may interfere with (also referred to herein as "desense" or "desensitize") an FM channel and may potentially interfere with adjacent FM channels.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
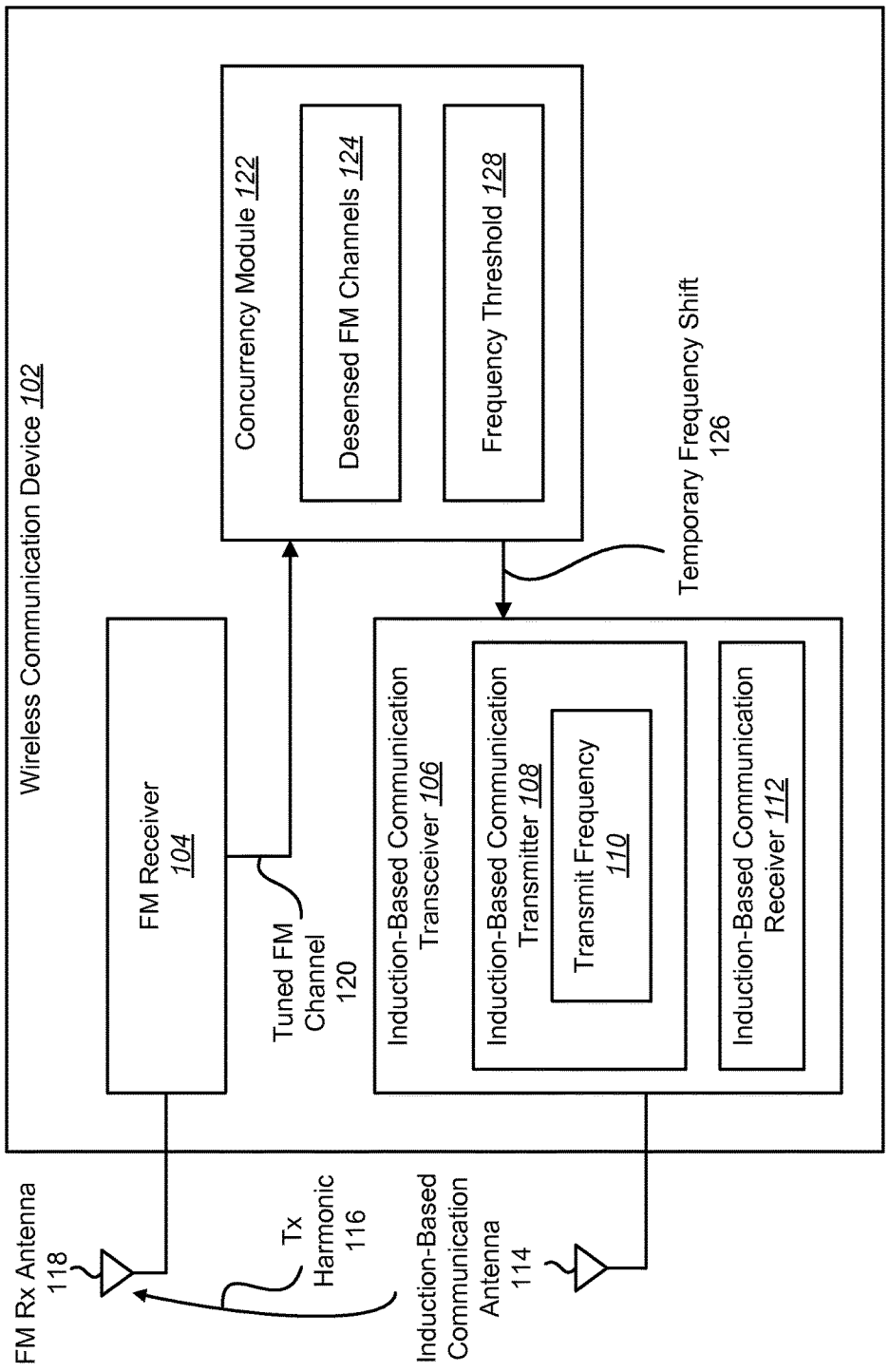
FIG. 1 is a block diagram illustrating one configuration of a wireless communication device in which systems and methods for reducing transmission interference may be implemented.

FIG. 1 is a block diagram illustrating one configuration of a wireless communication device 102 in which systems and methods for reducing transmission interference may be implemented. Wireless communication systems are widely deployed to provide various types of communication content such as voice, data, and so on. A wireless communication device 102 may include multiple communication technologies that may operate simultaneously (e.g., concurrently). For example, a wireless communication device 102 may include an FM receiver 104 that may receive an FM broadcast. The wireless communication device 102 may also include an induction-based communication transceiver 106 that may transmit and receive induction-based signals.

Communications in a wireless system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

A wireless communication system may utilize MIMO. A MIMO system may support both time division duplex (TDD) and frequency division duplex (FDD) systems. In a TDD system, uplink and downlink transmissions are on the same frequency region so that the reciprocity principle allows the estimation of the downlink channel from the uplink channel. This enables a transmitting wireless device (e.g., wireless communication device 102) to extract transmit beamforming gain from communications received by the transmitting wireless device.

A wireless communication system may be a multiple-access system capable of supporting communication with multiple wireless communication devices 102 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO), single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

In 3GPP Long Term Evolution (LTE) and UMTS, a wireless communication device 102 may be referred to as a "user equipment" (UE). In 3GPP Global System for Mobile Communications (GSM), a wireless communication device 102 may be referred to as a "mobile station" (MS). A wireless communication device 102 may also be referred to as, and may include some or all of the functionality of, a terminal, an access terminal, a subscriber unit, a station, etc. A wireless communication device 102 may be a cellular phone, a personal digital assistant (PDA), a wireless device, a wireless modem, a handheld device, a laptop computer, a Session Initiation Protocol (SIP) phone, a wireless local loop (WLL) station, etc.

The wireless communication device 102 may include an FM receiver 104, which may receive an FM broadcast via an FM Rx antenna 118. In one configuration, the FM Rx antenna 118 may reside in a wired headset connected to the wireless communication device 102.

The wireless communication device 102 may include an induction-based communication transceiver 106, which may establish radio communication with another wireless communication device 102 (e.g., a target) using magnetic induction. In one configuration, the induction-based communication transceiver 106 may be a near field communication (NFC) transceiver that operates according to NFC protocols. The induction-based communication transceiver 106 may include a transmitter 108 and a receiver 112.

The induction-based communication transmitter 108 may transmit a signal to another wireless communication device 102 via an induction-based communication antenna 114. One or more transmit (Tx) harmonics 116 may be generated from the transmission of the signal. A Tx harmonic 116 may also be referred to as a spurious emission or spur. A Tx harmonic 116 may be a multiple of a given transmit frequency 110. For example, the third harmonic of 100 Hz is 300 Hz. A Tx harmonic 116 may fall in the FM broadcast band (e.g., 76-108 megahertz MHz). A Tx harmonic 116 may be received by the FM Rx antenna 118 and may desense one or more FM channels.

The wireless communication device 102 may include a concurrency module 122 to provide concurrent operation of the FM receiver 104 and the induction-based communication transmitter 108. The concurrency module 122 may determine whether the FM receiver 104 is turned on and tuned to an FM channel desensed by the induction-based communication. In other words, the concurrency module 122 may determine whether the tuned FM channel 120 is a desensed FM channel 124. In one configuration, the concurrency module 122 may receive the tuned FM channel 120 from the FM receiver 104.

The concurrency module 122 may compare the tuned FM channel 120 to a list or table of desensed FM channels 124. If the concurrency module 122 determines that the FM receiver 104 is turned on and tuned to a desensed FM channel 124, then the concurrency module 122 may adjust the transmit frequency 110 of the induction-based communication transmitter 108 by a temporary frequency shift 126. For example, if the concurrency module 122 shifts the transmit frequency 110 of the induction-based communication transmitter 108 by a small factor, then the Tx harmonic 116 may be shifted away from the 200 kHz FM Rx channel bandwidth of an FM channel.

The concurrency module 122 may control the level of desense based on the amount the transmit frequency 110 of the induction-based communication transmitter 108 may be shifted. If the transmit frequency 110 of the induction-based communication transmitter 108 is shifted more than expected, interoperability with other induction-based communication devices may be affected. However, marked improvement in the sensitivity of the FM receiver 104 may be observed when interfering signals are moved from a co-channel location to adjacent channels. There will still be a marked improvement in FM sensitivity when the interfering spur (e.g., the Tx harmonic 116) is at the edges of the FM receiver 104 bandwidth rather than in the center of the FM receiver 104 bandwidth, as described below in connection with FIG. 5.

The concurrency module 122 may adjust the transmit frequency 110 of the induction-based communication transmitter 108 when the FM receiver is tuned to an affected FM channel (e.g., one of the desensed FM channels 124). The concurrency module 122 may also adjust the transmit frequency 110 of the induction-based communication transmitter 108 when the tuned FM channel 120 is within a frequency threshold 128 from a harmonic of the induction-based communication transmit frequency 110. For example, the concurrency module 122 may adjust the transmit frequency 110 when the FM receiver 104 is tuned to an FM channel 120 that is within a certain amount of a desensed FM channel 124. For other FM channels (that are not within the frequency threshold 128), no temporary frequency shift 126 of the transmit frequency 110 of the induction-based communication transmitter 108 is performed.

Figure 2:
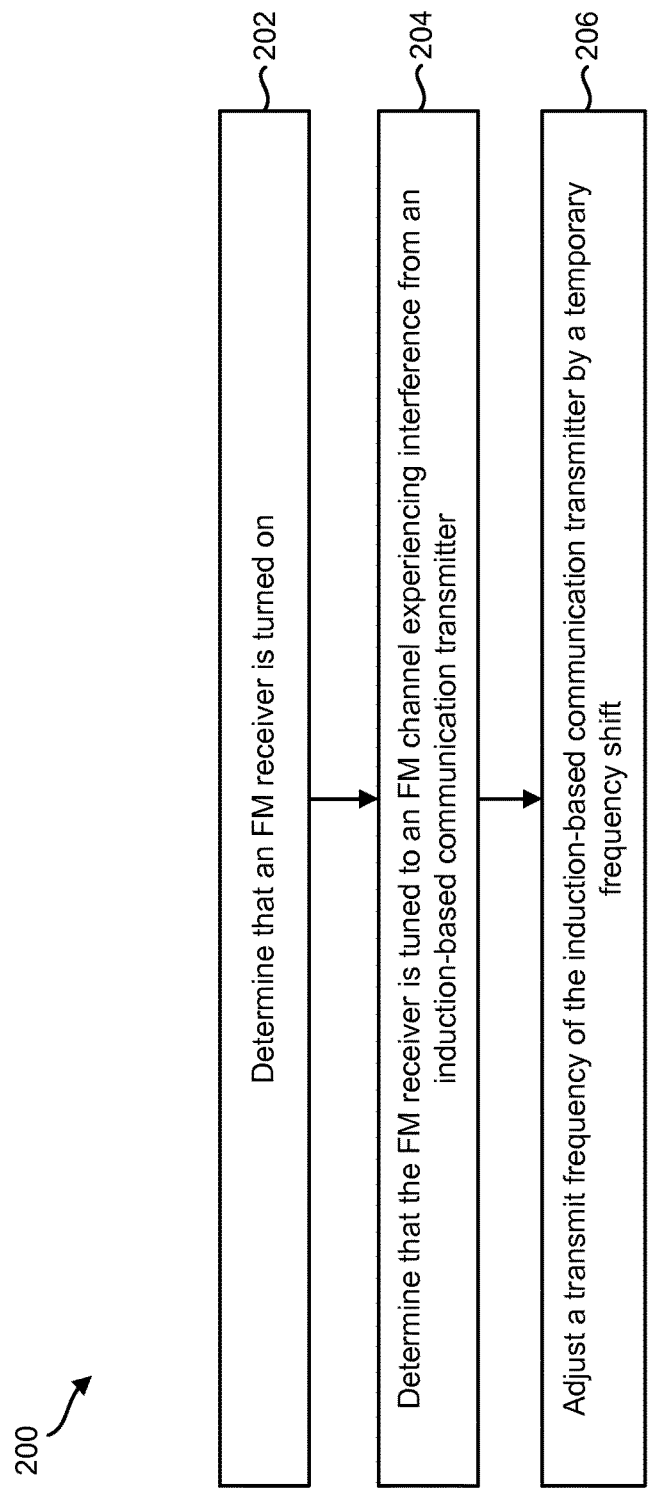
FIG. 2 is a flow diagram illustrating one configuration of a method for reducing transmission interference by induction-based communication.

FIG. 2 is a flow diagram illustrating one configuration of a method 200 for reducing transmission interference by induction-based communication. In one implementation, a wireless communication device 102 may perform the method 200 illustrated in FIG. 2 in order to mitigate FM desensitization by NFC.

The wireless communication device 102 may determine 202 whether the FM receiver 104 is turned on. The wireless communication device 102 may receive an FM broadcast. In one configuration, the FM receiver 104 of the wireless communication device 102 may receive a tuned FM channel 120 that is in the FM broadcast band (e.g., 76-108 MHz).

The wireless communication device 102 may determine 204 that the FM receiver 104 is tuned to an FM channel experiencing interference from an induction-based communication transmitter 108. A magnetic field of the induction-based communication may be inductively coupled with the FM receiver 104. The FM receiver 104 may receive one or more Tx harmonics 116 associated with a transmit frequency 110 of the induction-based communication transmitter 108. A Tx harmonic 116 may fall within the bandwidth of the tuned FM channel 120, which may interfere with the FM channel.

The wireless communication device 102 may compare the tuned FM channel 120 to a list or table of desensed FM channels 124. In one configuration, the desensed FM channels 124 may be FM channels that have a frequency that corresponds to a Tx harmonic 116 frequency.

If the wireless communication device 102 determines that the FM receiver 104 is turned on and tuned to an FM channel desensed by the induction-based communication transmitter 108, then the wireless communication device 102 may adjust 206 the transmit frequency 110 of the induction-based communication transmitter 108 by a temporary frequency shift 126. The temporary frequency shift 126 may reduce interference with the FM receiver 104. For example, by adjusting the transmit frequency 110 of the induction-based communication transmitter 108, the frequency of the Tx harmonic 116 may be shifted away from the tuned FM channel 120.

Figure 3:
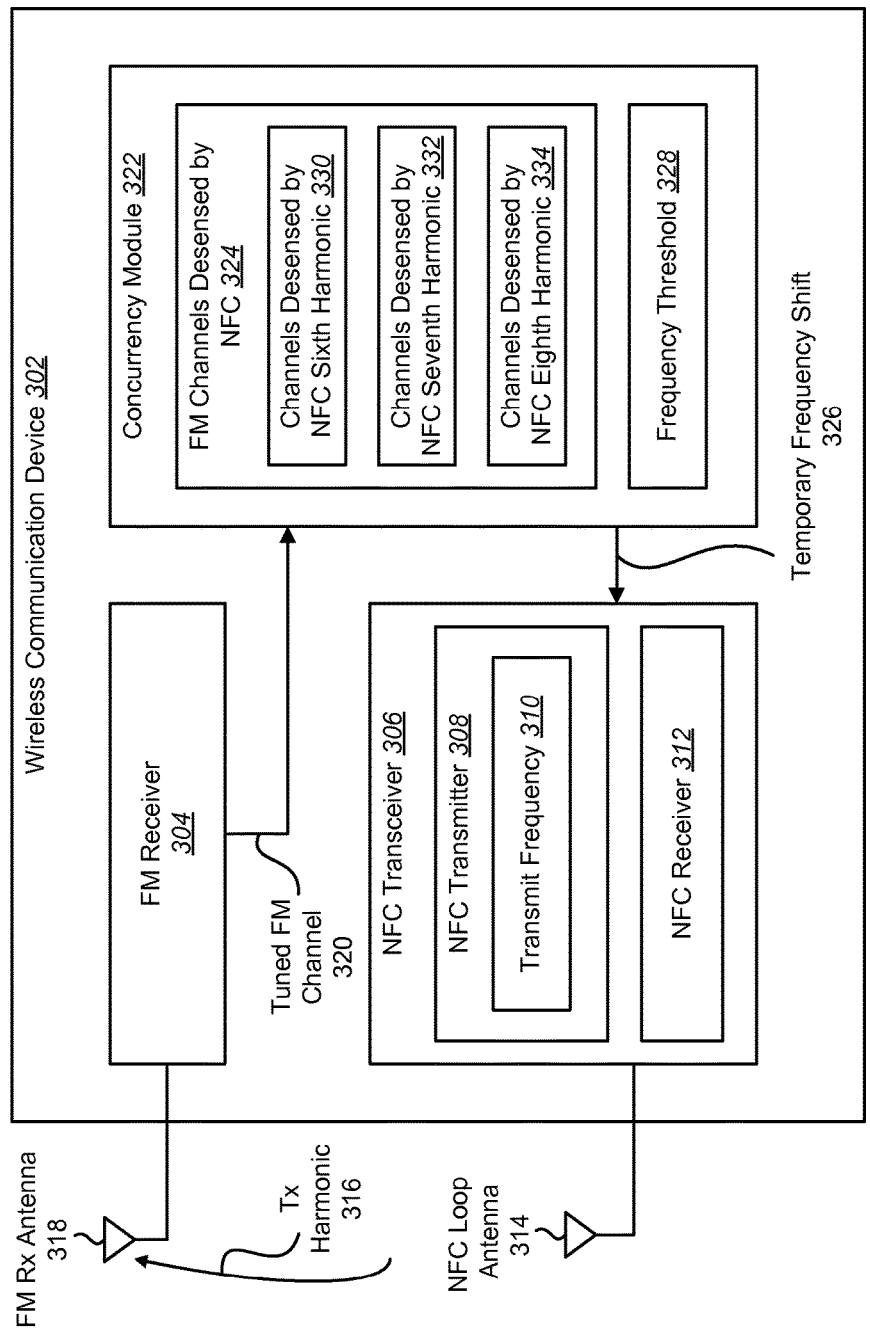
FIG. 3 is a block diagram illustrating another configuration of a wireless communication device in which systems and methods for reducing transmission interference may be implemented.

FIG. 3 is a block diagram illustrating another configuration of a wireless communication device 302 in which systems and methods for reducing transmission interference may be implemented. The wireless communication device 302 may include an FM receiver 304 and a near field communication (NFC) transceiver 306. The FM receiver 304 may receive an FM broadcast via an FM Rx antenna 318. In one configuration, the FM Rx antenna 318 may reside in a wired headset connected to the wireless communication device 302.

The wireless communication device 302 may include an NFC transceiver 306. The NFC transceiver 306 may include an NFC transmitter 308 and an NFC receiver 312. The NFC transceiver 306 may establish radio communication with another wireless communication device 302 (e.g., a target or NFC target device) using NFC protocols. NFC is an induction-based communication technology. Input power may be provided to an NFC transmitter 308 for generating a radiated field for providing energy transfer. An NFC receiver 312 of another wireless communication device 302 (not shown) may couple to the radiated field and may generate an output power. The two NFC-capable wireless communication devices 302 may be separated by a distance.

In one configuration, the NFC transmitter 308 of one wireless communication device 302 and the NFC receiver 312 of the other wireless communication device 302 are configured according to a mutual resonant relationship. When the resonant frequency of the NFC receiver 312 and the resonant frequency of the NFC transmitter 308 are very close, transmission losses between the NFC transmitter 308 and the NFC receiver 312 are minimal when the NFC receiver 312 is located in the "near field" of the radiated field.

The wireless communication device 302 may include an NFC loop antenna 314. The NFC loop antenna 314 may provide a means for energy transmission and reception. As stated, an efficient energy transfer may occur by coupling a large portion of the energy in the near field of a transmitting antenna to a receiving antenna rather than propagating most of the energy in an electromagnetic wave to the far field. When in this near field, a coupling mode may be developed between NFC loop antennas 314. The area around the NFC loop antennas 314 where this near field coupling may occur is referred to herein as a coupling-mode region.

NFC devices may obtain sufficient information to allow for communications to be established. One form of communication that may be established is an international standards organization data exchange protocol (ISO-DEP) communication link. Communications between the NFC devices may be enabled over a variety of NFC radio frequency (RF) technologies, including, but not limited to, NFC-A, NFC-B, etc.

An NFC-capable wireless communication device 302 may recognize an NFC target device and/or an unpowered NFC chip (e.g., NFC tag) when within range of the NFC coverage area of the wireless communication device 302. NFC involves an initiator and a target. The initiator may actively generate the radiated field. The target may be passive and may be powered by the radiated field.

The wireless communication device 302 may operate according to multiple NFC use cases. In one use case, the wireless communication device 302 may act as an initiator where the wireless communication device 302 is actively transmitting. In this case, the wireless communication device 302 is acting like a reader of an NFC tag (e.g., a passive tag). Furthermore, in this case, the wireless communication device 302 is generating the radiated field.

In another use case, the wireless communication device 302 is in peer-to-peer mode. In this case, the wireless communication device 302 may be communicating with another NFC peer device. The wireless communication device 302 can act as an initiator generating the radiated field, or the wireless communication device 302 can act as a target that is load modulating the radiated field of the NFC peer device.

In a third use case, the wireless communication device 302 may perform card emulation. In this case, the wireless communication device 302 may take the target role (e.g., passive role). The wireless communication device 302 may not initiate any radiated field. Instead, the wireless communication device 302 may modulate the radiated field of another NFC device.

In one configuration, the NFC transmitter 308 may transmit an NFC signal to another wireless communication device 302 or NFC tag via an NFC loop antenna 314. NFC typically operates at 13.56 MHz. One or more Tx harmonics 316 may be generated from the transmission of the NFC signal. A Tx harmonic 316 may fall in the FM broadcast band (e.g., 76-108 megahertz MHz). For instance, the sixth harmonic (e.g., 6*13.56 MHz=81.36 MHz), the seventh harmonic (e.g., 7*13.56 MHz=94.92 MHz) and the eighth harmonic (e.g., 8*13.56 MHz=108.48 MHz) fall onto the FM broadcast band.

The one or more Tx harmonics 316 may be received by the FM Rx antenna 318, which may interfere with (e.g., desense) one or more FM channels. For example, the sixth harmonic may interfere with the FM band (76-90 MHz) used in Japan, while the seventh and eighth harmonics may interfere with the FM band (87.7-108.0 MHz) used in the United States, Europe and other regions. FM channels may have center frequencies ending in 0.1, 0.3, 0.5, 0.7 and 0.9 MHz. In some countries, FM channels may also have center frequencies ending in 0.0, 0.2, 0.4, 0.6 and 0.8 MHz. An FM channel may be 200 kHz wide. When a Tx harmonic 316 falls on an FM operating frequency and the FM signal is weak (e.g., a weak FM station), then the user of the wireless communication device 302 may hear the impact of the Tx harmonic 316 on the FM channel.

Currently, known solutions allow the FM channel(s) to remain desensed or try to mask the audio degradation by muting FM or playing a system audio tone during an NFC transaction. For example, according to the known approaches, when a wireless communication device 302 detects a tag read (where the wireless communication device 302 is acting either as the tag or as the reader), or if the wireless communication device 302 is in peer-to-peer mode, the wireless communication device 302 may mute the FM audio and play system tones (e.g., a beeping sound) during an NFC transmission. In other words, the known approaches mask the FM audio during NFC transmissions. These known solutions either limit full concurrency or result in highly degraded FM audio quality and channel efficiency. These problems are especially pronounced in countries with limited FM broadcast stations (e.g. India).

In one scenario, an NFC device may perform a polling operation. For example, an NFC device may periodically check for the presence of other NFC devices and/or NFC tags. The polling period may be programmable, but typically the polling occurs every 300 milliseconds (ms), and the polling may last for 10 to 30 ms at a time. Therefore, an NFC-capable wireless communication device 302 may be continually going out and puncturing the FM audio, which may be heard by the user of the wireless communication device 302. In one configuration, NFC polling may occur when the wireless communication device 302 display is on. In another configuration, NFC polling may occur even when the wireless communication device 302 appears to be asleep. Therefore, if a user is listening to an FM channel and the display is off, NFC polling may result in audible FM interference.

The level of FM channel desensitization may vary based on the relative position of an FM Rx antenna 318 (e.g., a wired headset) to an NFC loop antenna 314. The wired headset is where the FM Rx antenna 318 may reside. Furthermore, the level of interference may vary based on the type of NFC transaction. Observations have shown a minimum of 10 decibels (dB) to greater than 50 dB of interference due to an NFC Tx harmonic 316 on an FM channel.

Built into the protocols for NFC is leniency on the transmit frequency 310 used. In other words, although the NFC transmit frequency 310 is specified as 13.56 MHz, frequencies of plus or minus 7 kHz from 13.56 MHz are acceptable for use in NFC transmissions. Therefore, NFC has a specified plus or minus 7 kHz bandwidth range. To reduce interference with the FM receiver 304, the wireless communication device 302 may shift the transmit frequency 310 off of 13.56 MHz. In one configuration, the transmit frequency 310 may be moved within the specified plus or minus 7 kHz bandwidth range when the FM receiver 304 is on a tuned FM channel 320 that may be affected by a Tx harmonic 316.

The wireless communication device 302 may include a concurrency module 322 to provide concurrent NFC and FM operation. The concurrency module 322 may provide communication between the FM receiver 304 and the NFC transceiver 306. The concurrency module 322 may determine whether the FM receiver 304 is turned on and tuned to an FM channel desensed by NFC 324. The concurrency module 322 may receive the tuned FM channel 320 from the FM receiver 304. In one configuration, the concurrency module 322 may compare the tuned FM channel 320 to a list or table of FM channels desensed by NFC 324. For example, the list or table of FM channels desensed by NFC 324 may include channels desensed by the NFC sixth harmonic 330, channels desensed by the NFC seventh harmonic 332 and/or channels desensed by the NFC eighth harmonic 334. This comparison may be based on a lookup table.

In another configuration, the concurrency module 322 may determine whether the tuned FM channel 320 is an FM channel desensed by NFC 324 based on a frequency threshold 328 comparison. The FM channels desensed by NFC 324 may be within a frequency threshold 328 of an NFC Tx harmonic 316. For example, the frequency threshold 328 may be plus or minus 0.3 MHz. The wireless communication device 302 may determine whether the tuned FM channel 320 is within plus or minus 0.3 MHz. In this case, the channels desensed by the NFC sixth harmonic 330 (e.g., 81.36 MHz) may include 81.1, 81.3 and 81.5 MHz. The channels desensed by the NFC seventh harmonic 332 (e.g., 94.92 MHz) may include 94.7, 94.9 and 95.1 MHz. It should be noted that the value of the frequency threshold 328 may be adjusted to include more or fewer FM channels. In other words, by increasing the frequency threshold 328, more surrounding FM channels may be included. Similarly, by decreasing the frequency threshold, fewer surrounding FM channels may be included.

If the concurrency module 322 determines that the FM receiver 304 is turned on and tuned to an FM channel desensed by NFC 324, then the concurrency module 322 may adjust the transmit frequency 310 of the NFC transmitter 308 by a temporary frequency shift 326. In one configuration, the temporary frequency shift 326 may be within plus or minus 7 kHz. Therefore, the temporary frequency shift 326 may be within the specified NFC transmit frequency bandwidth. It should be noted that if the concurrency module 322 shifts the transmit frequency 310 of the NFC transmitter 308 by a small factor, then the Tx harmonic 316 can be effectively shifted away from the center of the 200 kHz FM Rx channel bandwidth.

The concurrency module 322 may control the level of desense based on the amount that the transmit frequency 310 of the NFC transmitter 308 may be shifted. If the transmit frequency 310 of the NFC transmitter 308 is shifted more than expected (e.g., more than the 7 kHz as provided by NFC protocols), interoperability with other NFC devices and NFC tags may be affected. However, marked improvement in the sensitivity of the FM receiver 304 may be observed when interfering signals are moved from a co-channel location to adjacent channels. The temporary frequency shift 326 can be reduced in cases where the temporary frequency shift 326 results in interoperability issues with other NFC and/or radio frequency identification (RFID) devices and tags. There will still be a marked improvement in FM sensitivity when an interfering spur is at the edges of the FM receiver 304 bandwidth rather than in the center of the FM receiver 304 bandwidth. If the concurrency module 322 determines that the tuned FM channel 320 is not an FM channel desensed by NFC 324, then no temporary frequency shift 326 of the transmit frequency 310 of the NFC transmitter 308 is implemented.

In one configuration, the concurrency module 322 may shift the transmit frequency 310 of the NFC transmitter 308 based on the location of the tuned FM channel 320 to the Tx harmonic 316. Because the NFC bandwidth may be wider than the bandwidth of a spur, interference may be reduced by maximizing the distance between the tuned FM channel 320 and the Tx harmonic 316. If the tuned FM channel 320 is less than the Tx harmonic 316 frequency, then the temporary frequency shift 326 may be a positive shift. For example, if the FM receiver 304 is tuned to 94.9 MHz, then the temporary frequency shift 326 may be +7 kHz to maximize the distance of the center of the FM channel from the NFC seventh harmonic. In this case, the NFC seventh harmonic is shifted from 94.92 MHz to 94.969 MHz.

If the tuned FM channel 320 is greater than the Tx harmonic 316 frequency, then the temporary frequency shift 326 may be a negative shift. For example, if the FM receiver 304 is tuned to 95.1 MHz, then the temporary frequency shift 326 may be −7 kHz to maximize the distance of the center of the FM channel from the NFC seventh harmonic. In this case, the NFC seventh harmonic is shifted from 94.92 MHz to 94.871 MHz.

Figure 4:
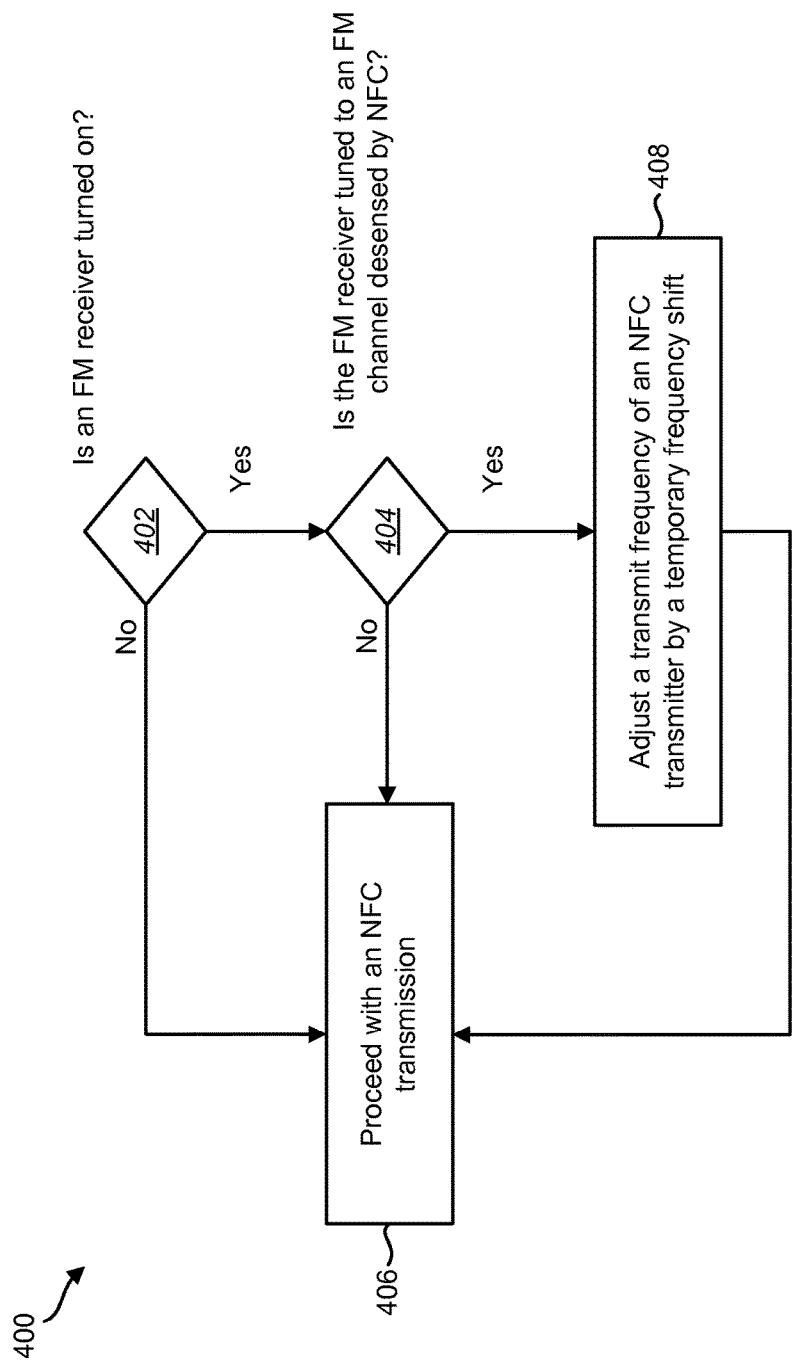
FIG. 4 is a flow diagram illustrating one configuration of a method for reducing transmission interference by near field communication (NFC)

FIG. 4 is a flow diagram illustrating one configuration of a method 400 for reducing transmission interference by NFC. A wireless communication device 302 may perform the method 400 illustrated in FIG. 4 in order to mitigate FM desensitization by NFC.

The wireless communication device 302 may determine 402 whether the FM receiver 304 is turned on. The wireless communication device 302 may receive an FM broadcast. The wireless communication device 302 may determine 402 whether the FM receiver 304 is active. If the wireless communication device 302 determines 402 that the FM receiver 304 is not turned on, then the wireless communication device 302 may proceed with an NFC transmission using the transmit frequency 310 of an NFC transmitter 308.

If the wireless communication device 302 determines 402 that the FM receiver 304 is turned on, then the wireless communication device 302 may determine 404 whether the FM receiver 304 is tuned to an FM channel desensed by NFC 324. In one configuration, the wireless communication device 302 may compare the tuned FM channel 320 to a list or table of FM channels desensed by NFC 324. In another configuration, the wireless communication device 302 may determine 404 whether the tuned FM channel 320 is an FM channel desensed by NFC 324 based on a frequency threshold 328 comparison. The FM channels desensed by NFC 324 may be within a frequency threshold 328 of an NFC Tx harmonic 316. This may be accomplished as described above in connection with FIG. 3.

If the wireless communication device 302 determines 404 that the FM receiver 304 is tuned to an FM channel desensed by NFC 324, then the wireless communication device 302 may adjust 408 a transmit frequency 310 of an NFC transmitter 308 by a temporary frequency shift 326. In one configuration, the temporary frequency shift 326 may be within plus or minus 7 kHz. Upon adjusting the transmit frequency 310 of the NFC transmitter 308 by the temporary frequency shift 326, the wireless communication device 302 may proceed 406 with an NFC transmission.

If the wireless communication device 302 determines 404 that the FM receiver 304 is not tuned to an FM channel desensed by NFC 324, then the wireless communication device 302 may proceed 406 with an NFC transmission. In other words, if the tuned FM channel 320 will not be desensed by NFC, then the wireless communication device 302 may proceed 406 with an NFC transmission without shifting the transmit frequency 310 of the NFC transmitter 308.

Figure 5:
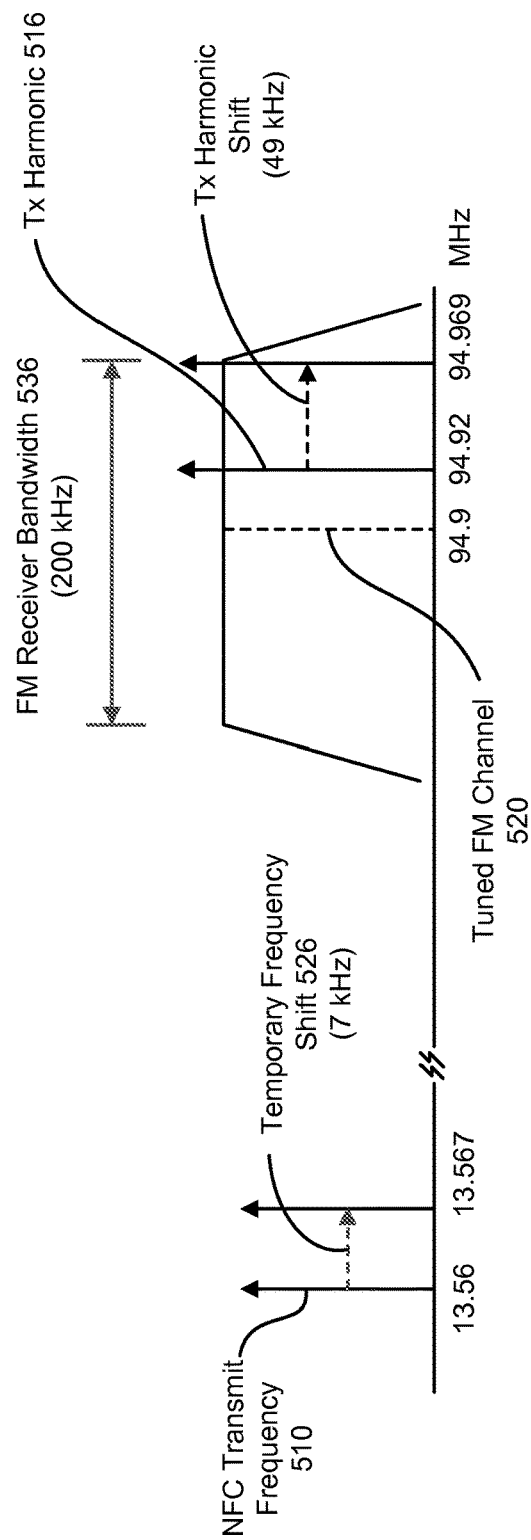
FIG. 5 is a graph illustrating an example of reducing transmission interference by NFC.

FIG. 5 is a graph illustrating an example of reducing transmission interference by NFC. This example illustrates the effects of a temporary frequency shift 526 of an NFC transmit frequency 510 in relation to a tuned FM channel 520. A wireless communication device 302 may include an FM receiver 304 and an NFC transceiver 306 as described above in connection with FIG. 3. The FM receiver 304 may be on a tuned FM channel 520 of 94.9 MHz. The tuned FM channel 520 has a receiver bandwidth 536 of 200 kHz centered at 94.9 MHz.

An NFC transmitter 308 may initially operate at an NFC transmit frequency 510 of 13.56 MHz. A Tx harmonic 516 corresponding to the seventh harmonic of the NFC transmit frequency 510 may have a frequency of 94.92 MHz (e.g., 7*13.56 MHz). It should be noted that the Tx harmonic 516 produced by the NFC transmit frequency 510 is located near the tuned FM channel 520. This may result in desensitization of FM channels at or near 94.92 MHz, particularly the tuned FM channel 520 at 94.9 MHz. When interference is in the center of an FM channel, the degradation in audio signal to noise ratio (SNR) is large, as compared to when interference is at the edge of the FM receiver bandwidth 536.

A temporary frequency shift 526 of 7 kHz may be applied to the NFC transmit frequency 510. The temporary frequency shift 526 may shift the NFC transmit frequency 510 to 13.567 MHz. The temporary frequency shift 526 produces a corresponding shift in the Tx harmonic 516 of 49 kHz. In this case, the shift in the Tx harmonic 516 (e.g., the seventh harmonic of the NFC transmit frequency 510) is seven times the temporary frequency shift 526 (e.g., 7*7 kHz). By applying a minute temporary frequency shift 526 to the NFC transmit frequency 510, the Tx harmonic 516 may be shifted away from the center of the FM receiver bandwidth 536 of the tuned FM channel 520, which may result in reduced transmission interference.

Figure 6:
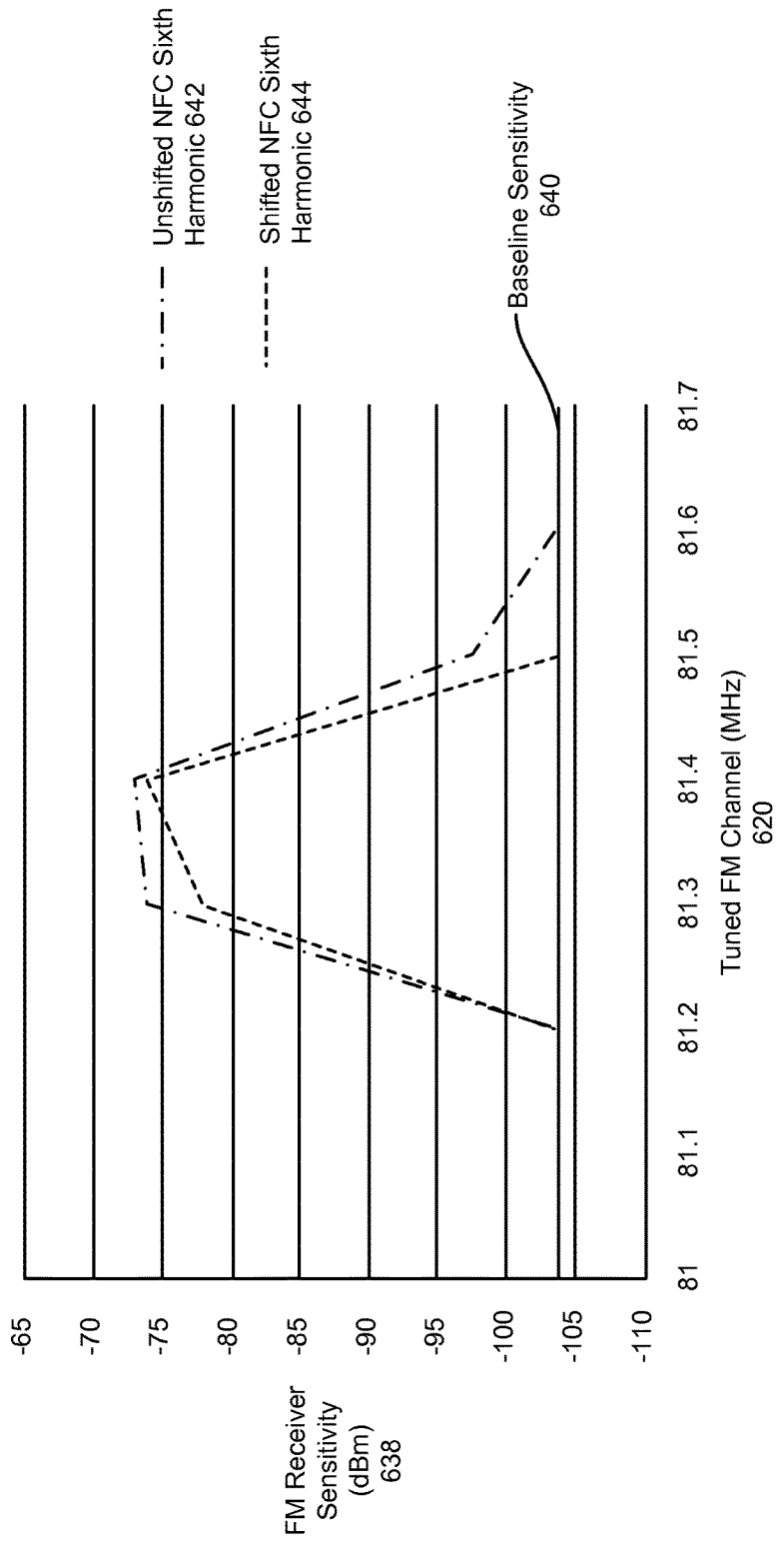
FIG. 6 is a graph illustrating an example of FM receiver sensitivity for an unshifted NFC sixth harmonic and a shifted NFC sixth harmonic.

FIG. 6 is a graph illustrating an example of FM receiver sensitivity 638 for an unshifted NFC sixth harmonic 642 and a shifted NFC sixth harmonic 644. The FM receiver sensitivity 638 is expressed as a power ratio in decibels (dB) of the measured power referenced to one milliwatt (mW) (dBm). The FM receiver sensitivity 638 is shown relative to tuned FM channels 620 (81.0-81.7 MHz). In the case where no interferer (e.g., Tx harmonic 316) is present, the baseline sensitivity 640 is −104 dBm (where the negative value indicates a received signal).

The effects of an unshifted NFC sixth harmonic 642 and a shifted NFC sixth harmonic 644 on FM receiver sensitivity 638 are shown relative to the frequencies of tuned FM channels 620. The unshifted NFC sixth harmonic 642 and the shifted NFC sixth harmonic 644 each have signal strengths of −75 dBm. In the presence of the unshifted NFC sixth harmonic 642, the FM receiver sensitivity 638 is reduced between FM frequencies 81.2-81.6 MHz. The greatest impact on the FM receiver sensitivity 638 by the unshifted NFC sixth harmonic 642 occurs at 81.4 MHz where the FM receiver sensitivity 638 drops to −73 dBm.

The transmit frequency 310 of the NFC transmitter 308 is shifted by plus/minus 7 kHz to produce the shifted NFC sixth harmonic 644. If the tuned FM channel 620 is greater than the NFC sixth harmonic (e.g., 6*13.56 MHz=81.36 MHz), then the transmit frequency 310 of the NFC transmitter 308 is shifted by minus 7 kHz. This will maximize the distance between the shifted NFC sixth harmonic 644 and the tuned FM channel 620. Alternatively, if the tuned FM channel 620 is less than the NFC sixth harmonic, then the transmit frequency 310 of the NFC transmitter 308 is shifted by plus 7 kHz.

In the presence of the shifted NFC sixth harmonic 644, the FM receiver sensitivity 638 is reduced between FM frequencies 81.2-81.5 MHz. As observed in FIG. 6, the shifted NFC sixth harmonic 644 reduces the amount of FM desensitization caused by an NFC transmission.

Figure 7:
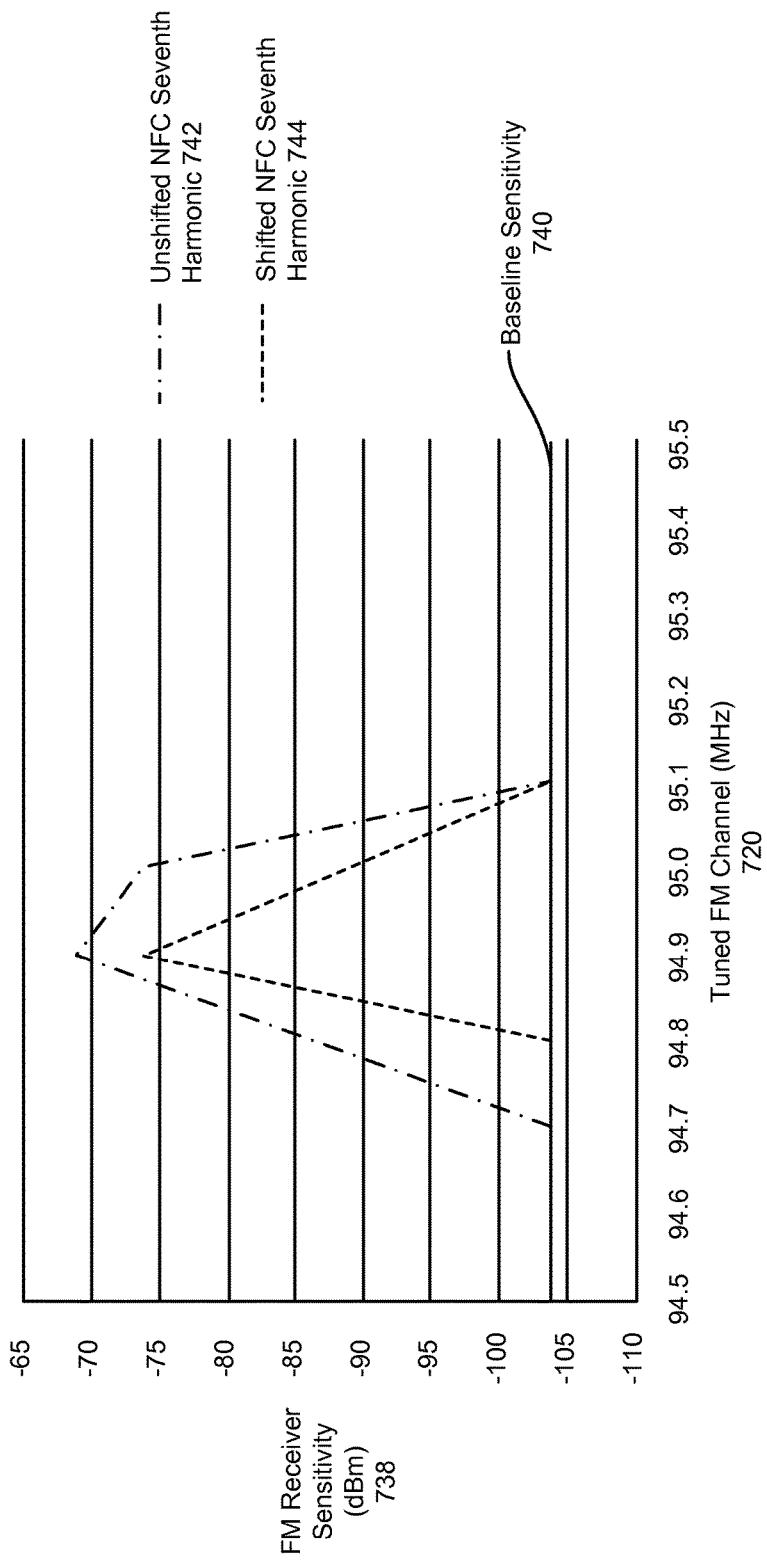
FIG. 7 is a graph illustrating an example of FM receiver sensitivity for an unshifted NFC seventh harmonic and a shifted NFC seventh harmonic.

FIG. 7 is a graph illustrating an example of FM receiver sensitivity 738 for an unshifted NFC seventh harmonic 742 and a shifted NFC seventh harmonic 744. The FM receiver sensitivity 738 is shown relative to the frequencies of tuned FM channels 720 (94.5-95.5 MHz). In the case where no interferer (e.g., Tx harmonic 316) is present, the baseline sensitivity 740 is −104 dBm.

The effects of an unshifted NFC seventh harmonic 742 and a shifted NFC seventh harmonic 744 on FM receiver sensitivity 738 are shown relative to FM frequencies. The unshifted NFC seventh harmonic 742 and the shifted NFC seventh harmonic 744 each have signal strengths of −75 dBm. In the presence of the unshifted NFC seventh harmonic 742, the FM receiver sensitivity 738 is reduced between the FM frequencies 94.7-95.1 MHz.

The transmit frequency 310 of the NFC transmitter 308 is shifted by plus/minus 7 kHz to produce the shifted NFC seventh harmonic 744. If the tuned FM channel 720 is greater than the NFC seventh harmonic (e.g., 7*13.56 MHz=94.92 MHz), then the transmit frequency 310 of the NFC transmitter 308 is shifted by minus 7 kHz. This will maximize the distance between the shifted NFC seventh harmonic 744 and the tuned FM channel 720. Alternatively, if the tuned FM channel 720 is less than the NFC seventh harmonic, then the transmit frequency 310 of the NFC transmitter 308 is shifted by plus 7 kHz.

In the presence of the shifted NFC seventh harmonic 744, the FM receiver sensitivity 738 is reduced between FM frequencies 94.8-95.1 MHz. As observed in FIG. 7, the shifted NFC seventh harmonic 744 reduces the amount of FM desensitization caused by an NFC transmission.

Figure 8:
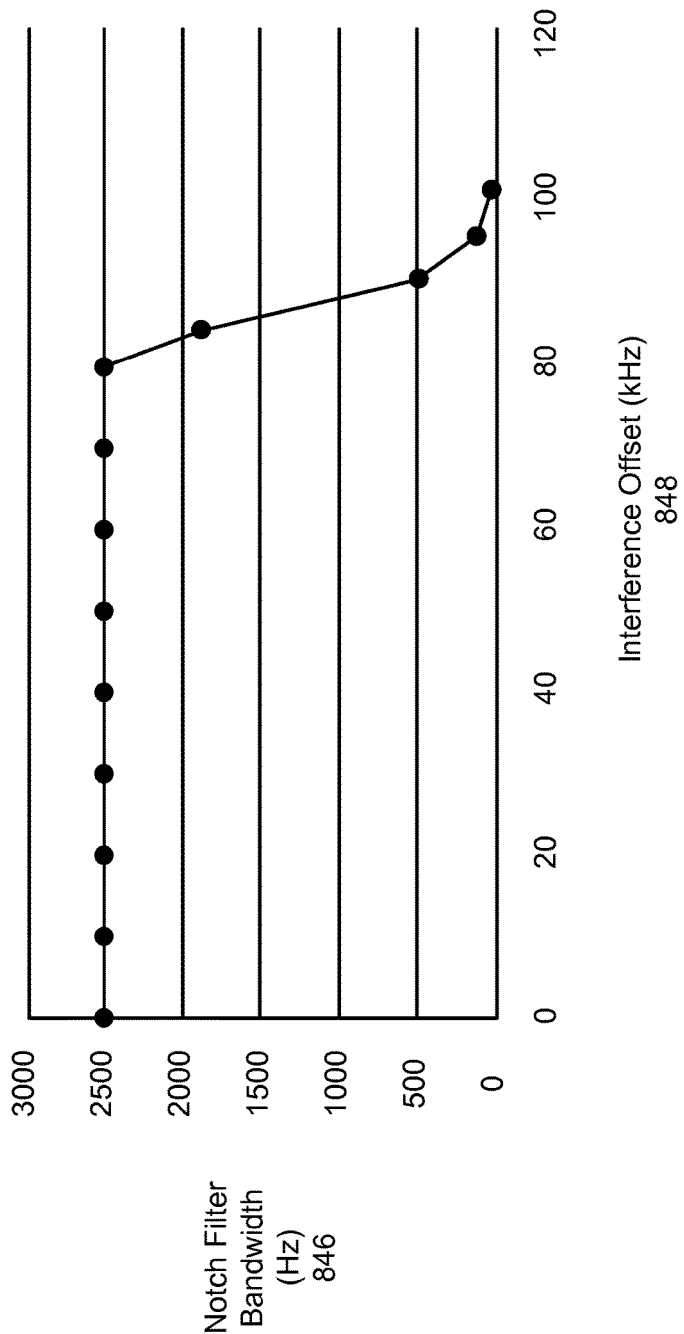
FIG. 8 is a graph illustrating an example of FM notch filter bandwidth relative to interference offset.

FIG. 8 is a graph illustrating an example of FM notch filter bandwidth 846 relative to interference offset 848. The simulation results of FIG. 8 demonstrate that as an interfering spur (e.g., a Tx harmonic 116) is moved farther away from the center of an FM channel (located at 100 kHz) the FM notch filter bandwidth 846 can be widened. As the FM notch filter bandwidth 846 increases, an FM notch filter may reject more interference.

Because the FM notch filter (also referred to as a spur filter) not only removes or reduces interference, the FM notch filter may also remove a portion of the FM signal itself. As a result, the audio quality may be degraded. However, FIG. 8 shows that as the NFC carrier shift is increased from the center of the FM channel (e.g., as the interference offset 848 moves from 100 kHz), the FM notch filter bandwidth 846 can also increase. A wider FM notch filter bandwidth 846 can be utilized since the interference is farther from the center of the FM channel. This may result in less degradation in audio quality due to the wider removed portion of the FM signal compared to the impairment from the NFC interference. Furthermore, a greater FM notch filter bandwidth 846 may result in wider interference being notched out.

Figure 9:
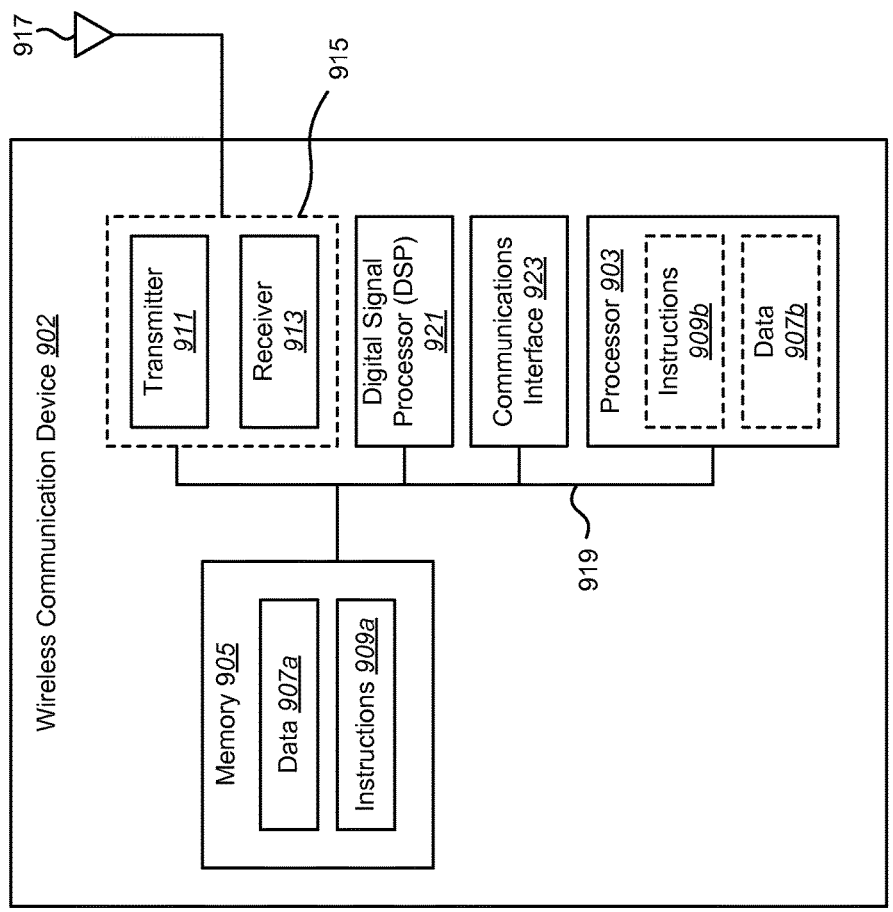
FIG. 9 illustrates certain components that may be included within a wireless communication device.

FIG. 9 illustrates certain components that may be included within a wireless communication device 902. The wireless communication device 902 may be an access terminal, a mobile station, a user equipment (UE), etc. For example, the wireless communication device 902 may be the wireless communication device 102 of FIG. 1 or the wireless communication device 302 of FIG. 3.

The wireless communication device 902 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 902 of FIG. 9, in an alternative configuration, a combination of processors (e.g., an ARM and DSP) could be used.

The wireless communication device 902 also includes memory 905 in electronic communication with the processor (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, erasable programmable read-only memory (EPROM), electrically erasable PROM (EEPROM), registers and so forth, including combinations thereof.

Data 907a and instructions 909a may be stored in the memory 905. The instructions may include one or more programs, routines, sub-routines, functions, procedures, code, etc. The instructions may include a single computer-readable statement or many computer-readable statements. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 902 may also include a transmitter 911 and a receiver 913 to allow transmission and reception of signals to and from the wireless communication device 902 via an antenna 917. The transmitter 911 and receiver 913 may be collectively referred to as a transceiver 915. The wireless communication device 902 may also include (not shown) multiple transmitters, multiple antennas, multiple receivers and/or multiple transceivers.

The wireless communication device 902 may include a digital signal processor (DSP) 921. The wireless communication device 902 may also include a communications interface 923. The communications interface 923 may allow a user to interact with the wireless communication device 902.

The various components of the wireless communication device 902 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refer to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing transmission interference, comprising:
    determining that an FM receiver is turned on;
    determining that the FM receiver is tuned to an FM channel experiencing interference from a harmonic of a transmit frequency of an induction-based communication transmitter;
    determining a location of the tuned FM channel relative to a frequency of the harmonic;
    adjusting the transmit frequency of the induction-based communication transmitter off a specified near field communication (NFC) transmit frequency by a temporary frequency shift during a concurrent operation of the FM receiver and the induction-based communication transmitter,
    wherein the adjusted transmit frequency is within a specified NFC transmit frequency range,
    wherein the temporary frequency shift is set to a positive shift during the concurrent operation of the FM receiver and the induction-based communication transmitter in response to a determination that the location of the tuned FM channel is less than the frequency of the harmonic, wherein the positive shift maximizes a distance of the harmonic from a center of the tuned FM channel, and
    wherein the temporary frequency shift is set to a negative shift during the concurrent operation of the FM receiver and the induction-based communication transmitter in response to a determination that the location of the tuned FM channel is greater than the frequency of the harmonic, wherein the negative shift maximizes the distance of the harmonic from the center of the tuned FM channel; and
    increasing an FM notch filter bandwidth based on the temporary frequency shift.

2. The method of claim 1, wherein the method is performed by a wireless communication device.

3. The method of claim 1, wherein a magnetic field of the induction-based communication transmitter is inductively coupled with the FM receiver.

4. The method of claim 1, wherein determining that the FM receiver is tuned to an FM channel experiencing interference from the harmonic of the transmit frequency of the induction-based communication transmitter comprises comparing the tuned FM channel to a list of desensed FM channels.

5. The method of claim 1, wherein the temporary frequency shift reduces interference with the FM receiver.

6. The method of claim 1, wherein adjusting the transmit frequency of the induction-based communication transmitter comprises adjusting the transmit frequency when the tuned FM channel is within a frequency threshold from the harmonic of the transmit frequency of the induction-based communication transmitter.

7. The method of claim 1, wherein the induction-based communication transmitter is an NFC transmitter.

8. The method of claim 7, wherein the NFC transmitter is acting as an initiator.

9. The method of claim 7, wherein the NFC transmitter is performing a polling operation.

10. The method of claim 1, wherein the specified NFC transmit frequency is 13.56 MHz and the specified NFC transmit frequency range is plus or minus 7 kHz.

11. An apparatus for reducing transmission interference, comprising:
    a processor;
    memory in electronic communication with the processor; and
    instructions stored in the memory, the instructions being executable by the processor to:
    determine that an FM receiver is turned on;
    determine that the FM receiver is tuned to an FM channel experiencing interference from a harmonic of a transmit frequency of an induction-based communication transmitter;
    determine a location of the tuned FM channel relative to a frequency of the harmonic;

adjust the transmit frequency of the induction-based communication transmitter off a specified near field communication (NFC) transmit frequency by a temporary frequency shift during a concurrent operation of the FM receiver and the induction-based communication transmitter, wherein the adjusted transmit frequency is within a specified NFC transmit frequency range, wherein the temporary frequency shift is set to a positive shift during the concurrent operation of the FM receiver and the induction-based communication transmitter in response to a determination that the location of the tuned FM channel is less than the frequency of the harmonic, wherein the positive shift maximizes a distance of the harmonic from a center of the tuned FM channel, and wherein the temporary frequency shift is set to a negative shift during the concurrent operation of the FM receiver and the induction-based communication transmitter in response to a determination that the location of the tuned FM channel is greater than the frequency of the harmonic, wherein the negative shift maximizes the distance of the harmonic from the center of the tuned FM channel; and increase an FM notch filter bandwidth based on the temporary frequency shift.

12. The apparatus of claim 11, wherein a magnetic field of the induction-based communication transmitter is inductively coupled with the FM receiver.

13. The apparatus of claim 11, wherein the instructions executable to determine that the FM receiver is tuned to an FM channel experiencing interference from the harmonic of the transmit frequency of the induction-based communication transmitter comprise instructions executable to compare the tuned FM channel to a list of desensed FM channels.

14. The apparatus of claim 11, wherein the temporary frequency shift reduces interference with the FM receiver.

15. The apparatus of claim 11, wherein the instructions executable to adjust the transmit frequency of the induction-based communication transmitter comprise instructions executable to adjust the transmit frequency when the tuned FM channel is within a frequency threshold from the harmonic of the transmit frequency of the induction-based communication transmitter.

16. The apparatus of claim 11, wherein the induction-based communication transmitter is an NFC transmitter.

17. A wireless device for reducing transmission interference, comprising:
means for determining that an FM receiver is turned on;
means for determining that the FM receiver is tuned to an FM channel experiencing interference from a harmonic of a transmit frequency of an induction-based communication transmitter;
means for determining a location of the tuned FM channel relative to a frequency of the harmonic;
means for adjusting the transmit frequency of the induction-based communication transmitter off a specified near field communication (NFC) transmit frequency by a temporary frequency shift during a concurrent operation of the FM receiver and the induction-based communication transmitter,
wherein the adjusted transmit frequency is within a specified NFC transmit frequency range,
wherein the temporary frequency shift is set to a positive shift during the concurrent operation of the FM receiver and the induction-based communication transmitter in response to a determination that the location of the tuned FM channel is less than the frequency of the harmonic, wherein the positive shift maximizes a distance of the harmonic from a center of the tuned FM channel, and
wherein the temporary frequency shift is set to a negative shift during the concurrent operation of the FM receiver and the induction-based communication transmitter in response to a determination that the location of the tuned FM channel is greater than the frequency of the harmonic, wherein the negative shift maximizes the distance of the harmonic from the center of the tuned FM channel; and
means for increasing an FM notch filter bandwidth based on the temporary frequency shift.

18. The wireless device of claim 17, wherein the means for determining that the FM receiver is tuned to an FM channel experiencing interference from the harmonic of the transmit frequency of the induction-based communication transmitter comprise means for comparing the tuned FM channel to a list of desensed FM channels.

19. The wireless device of claim 17, wherein the temporary frequency shift reduces interference with the FM receiver.

20. The wireless device of claim 17, wherein the means for adjusting the transmit frequency of the induction-based communication transmitter comprises means for adjusting the transmit frequency when the tuned FM channel is within a frequency threshold from the harmonic of the transmit frequency of the induction-based communication transmitter.

21. A non-transitory computer-readable medium having instructions thereon, the instructions comprising:
code for causing a wireless communication device to determine that an FM receiver is turned on;
code for causing the wireless communication device to determine that the FM receiver is tuned to an FM channel experiencing interference from a harmonic of a transmit frequency of an induction-based communication transmitter;
code for causing the wireless communication device to determine a location of the tuned FM channel relative to a frequency of the harmonic;
code for causing the wireless communication device to adjust the transmit frequency of the induction-based communication transmitter off a specified near field communication (NFC) transmit frequency by a temporary frequency shift during a concurrent operation of the FM receiver and the induction-based communication transmitter,
wherein the adjusted transmit frequency is within a specified NFC transmit frequency range,
wherein the temporary frequency shift is set to a positive shift during the concurrent operation of the FM receiver and the induction-based communication transmitter in response to a determination that the location of the tuned FM channel is less than the frequency of the harmonic, wherein the positive shift maximizes a distance of the harmonic from a center of the tuned FM channel, and
wherein the temporary frequency shift is set to a negative shift during the concurrent operation of the FM receiver and the induction-based communication transmitter in response to a determination that the location of the tuned FM channel is greater than the frequency of the harmonic, wherein the negative shift maximizes the distance of the harmonic from the center of the tuned FM channel; and code for causing the wireless communication device to increase an FM notch filter bandwidth based on the temporary frequency shift.

22. The non-transitory computer-readable medium of claim 21, wherein the code for causing the wireless communication device to determine that the FM receiver is tuned to an FM channel experiencing interference from the harmonic of the transmit frequency of the induction-based communication transmitter comprises code for causing the wireless communication device to compare the tuned FM channel to a list of desensed FM channels.

23. The non-transitory computer-readable medium of claim 21, wherein the temporary frequency shift reduces interference with the FM receiver.

24. The non-transitory computer-readable medium of claim 21, wherein the code for causing the wireless communication device to adjust the transmit frequency of the induction-based communication transmitter comprises code for causing the wireless communication device to adjust the transmit frequency when the tuned FM channel is within a frequency threshold from the harmonic of the transmit frequency of the induction-based communication transmitter.

25. The non-transitory computer-readable medium of claim 21, wherein the induction-based communication transmitter is an NFC transmitter.

* * * * *